Feb. 25, 1969
H. FRIGGER
3,429,405
DISK-BRAKE AND ACTUATING MEANS THEREFOR
Filed June 8, 1967
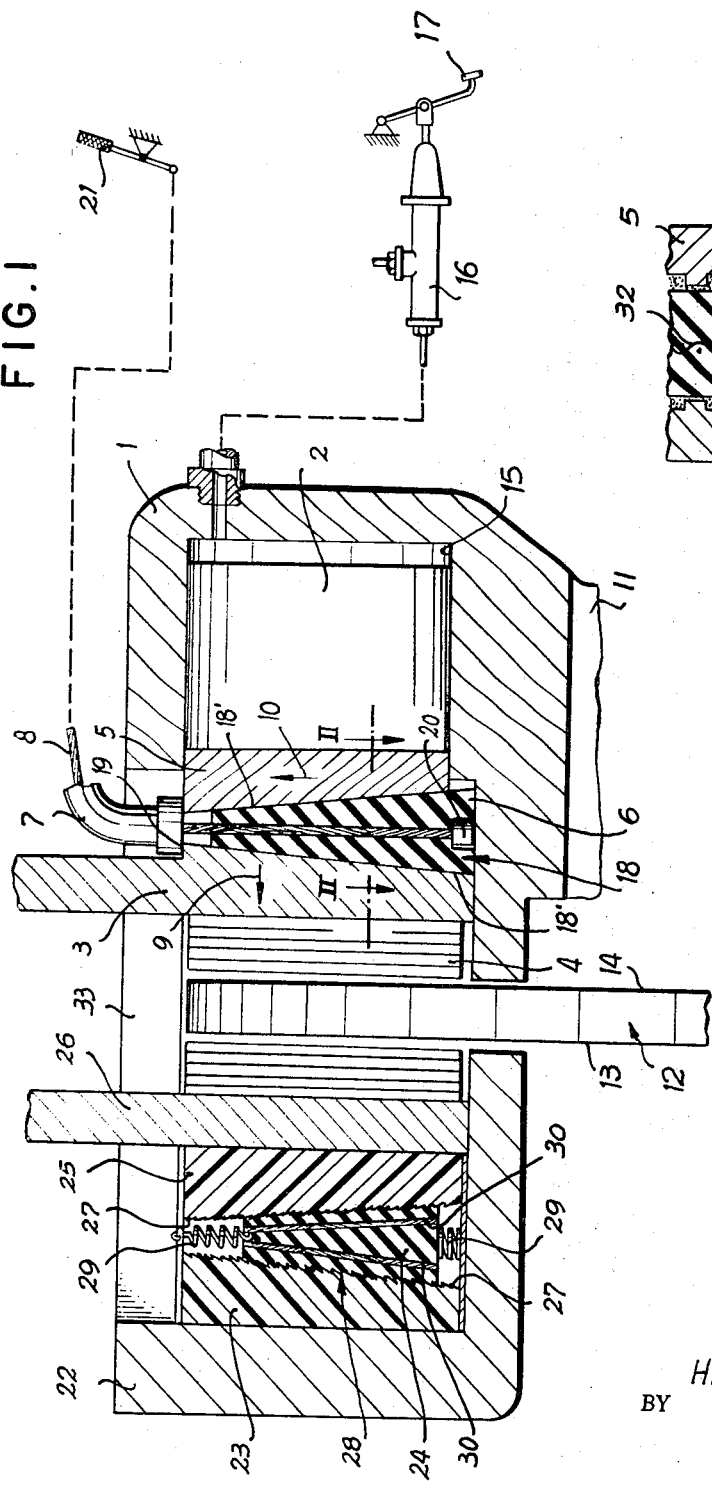
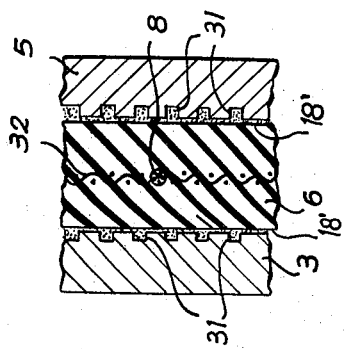
INVENTOR.
HEINZ FRIGGER.
BY
Karl F. Ross
ATTORNEY United States Patent Office 3,429,405
Patented Feb. 25, 1969

3,429,405
DISK-BRAKE AND ACTUATING MEANS
THEREFOR
Heinz Frigger, Langen-Oberlinden, Germany, assignor to
Alfred Teves Maschinen- und Armaturenfabrik, KG,
Frankfurt am Main, Germany, a corporation of
Germany
Filed June 8, 1967, Ser. No. 644,589
Claims priority, application Germany, June 29, 1966,
T 31,478
U.S. Cl. 188—73    8 Claims
Int. Cl. F16d 55/00, 65/14, 65/38

ABSTRACT OF THE DISCLOSURE

A disk-brake assembly having a brake yoke, an actuating member such as a piston mounted in the yoke, and a brakeshoe urged by the actuating member against a brake disk which is rotatable relatively to the support, the assembly having between the actuating member and the backing plate of the brakeshoe a vibration damping, heat-insulating body which simultaneously serves as a member for urging the brakeshoe against the disk for emergency-brake, locking-brake and parking-brake purposes or as a self-adjusting means compensating for brake wear. The body, which may be a wedge shiftable by a spring or, preferably, a remotely controlled Bowden cable, is composed of a synthetic resin or elastomer of an elastically compressible character, preferably neoprene, polytetrafluoroethylene, polyurethane or superpolyamide, and is reinforced by a network of steel wires or cables while the parts co-operating therewith are provided with graphite-containing lubrication channels.

My present invention relates to a disk-brake arrangement and, more particularly, to a disk-brake assembly for motor vehicles having self-adjusting means or manually operable means serving as a parking, locking or emergency brake.

A conventional disk-brake assembly comprises a brake yoke or support disposed along the periphery of a brake disk which is connected to the axle or wheel of the motor vehicle, while the brake support is more or less fixed to a nonrotatable part of the vehicle such as the chassis or the axle housing. In such devices, an actuating member, generally a hydraulically shiftable piston, is axially movable perpendicularly to the annular braking faces of the disk to urge a brakeshoe thereagainst. A pair of such brakeshoes can be provided in juxtaposition with one another on opposite sides of the disk and may sandwich the latter between them. Thus, when the brake yoke or support is axially movable "floating," only a single hydraulic cylinder (i.e., wheel-brake cylinder) need be provided since the piston urges one of the brakeshoes against the disk directly while the other brakeshoe is drawn against the disk by the other lobe of the disk because of the hydraulic reaction force on the cylinder. In a stationary-yoke assembly, a single wheel-brake cylinder can be employed if the brake disk is splined or keyed to its shaft so as to be axially shiftable, although a pair of such cylinders is provided when both the disk and the yoke are axially fixed.

In my commonly assigned copending application Ser. No. 642,915, filed June 1, 1967, entitled, "Disk-Brake System," I have described and claimed an arrangement wherein the brake-support yoke contains an actuating piston as described above while auxiliary means is mounted on the support for shifting the brakeshoe relatively to the disk and includes a wedge member having at least one wedging surface converging at an acute angle toward a braking face of the disk; this wedge member or body is shiftable in the direction of convergence of the wedging surface while being interposed between the support and the piston or between the piston and the brakeshoe by a Bowden cable, spindle, eccentric, cam or spring for applying a force to the wedge body in the direction of the annular braking face of the disk. Thus, when the operating means is provided, the wedge body functions as part of a locking, emergency or parking brake, while automatic displacement of the wedge body (e.g., by the spring) can take up excessive play between the brakeshoe and the disk resulting from wear of the brake linings. As pointed out there, this system has the advantage that it greatly simplifies both self-adjusting and remotely operable auxiliary braking devices which, prior to that development, were relatively complex, prone to failure and difficult to provide or maintain. In fact, the complex built-in self-adjusting devices and mechanisms for locking the brake were avoided.

Other disadvantages of prior systems are, of course, well known to those skilled in the art. Firstly, a disk brake has a tendency toward vibration or chatter by virtue of its peripheral engagement with the disk and its unbalanced position with respect to the axis of rotation thereof. The resulting vibrational stresses tend to loosen the bolts, damage the moving parts and render ineffective the hydraulic seal, while causing early deterioration of the brake lining. Secondly, when such brakes are used for automotive purposes, the frictional engagement by the brake lining of the disk results in a substantial development of heat which may be transmitted through the brakeshoe to the piston and, by the latter, to the hydraulic fluid behind it. As a consequence, thermal deterioration or even evaporation and gas-cushion formation within the hydraulic system is a significant problem.

It is, therefore, the principal object of the present invention to provide an improved brake arrangement with self-adjusting means for compensation of brake wear and/or a remotely controllable locking arrangement adapted to serve as an emergency or parking brake which extends the principles originally set forth in the aforementioned copending application.

A further object of my invention is to provide an improved disk-brake assembly in which vibrational stresses are damped or eliminated.

Another object of the instant invention is to provide a disk-brake system having simplified self-adjusting means or remotely operable brakeshoe-control means which is less prone to deterioration from thermal effects than prior-art brake systems.

I have now found that these objects can be attained surprisingly simply by interposing between the brakeshoe member and the piston member or support member, a generally platelike or flat body of a vibration-damping material, preferably a synthetic elastomer or synthetic resin, which constitutes one element of a self-adjusting or remotely controllable auxiliary mechanism operating with wedge surfaces and having a wedge body displaceable in the direction of convergence of the wedging surfaces by manually operable or automatic means.

According to an important feature of this invention, therefore, the wedge body is constituted of the elastically compressible material and may be provided with reinforcing materials as will become apparent hereinafter. Best results have been found with bodies of neoprenes (elastomers constituted generally of polymeric chloroprene), Teflon (polytetrafluoroethylene), polyurethanes and superpolyamides. These materials, advantageously reinforced with steel layers (e.g., steel cables or woven networks) have been found to eliminate vibration transmission to the support and the piston from the brakeshoe and to substantially damp by the inherent yieldability of the body, even the vibrations of the brakeshoe induced by its contacts with the disk. Furthermore, such materials act as thermal insulators preventing transmission of heat from the brakeshoe to the piston and thereby increasing the useful life of the piston seals and the hydraulic fluid. A further advantage resides in the fact that the body acts as a sound-damping material.

According to an important feature of this invention, the wedge-shaped synthetic resin or elastomeric body, which may be self-locking upon its advance in the direction of convergence of its surfaces, co-operates with inclined-plane surfaces formed by the backing plate of the brakeshoe, the forward face of the piston and/or members interposed between them and the wedge body as described and claimed in the aforementioned application. These intervening members can likewise be composed of a sound- and vibration-damping elastomeric material or synthetic resin. The co-operating surfaces, i.e., the faces of the members flanking the wedge body, may be provided, in accordance with this invention, with slits, slots or grooves running in the direction of movement of the wedge body or transversely thereto, these grooves or recesses being filled with a friction-reducing material, preferably a solid lubricant such as graphite or molybdenum disulfide. In addition, or alternatively, the wedge body can be composed of a self-lubricating material (e.g., polytetrafluoroethylene) or may have a solid lubricant such as graphite or molybdenum sulfide dispersed therein.

The above and other objects, features and advantages of the present invention will become more readily apparent from the following description, reference being made to the accompanying drawing in which:

FIG. 1 is a diagrammatic, axial cross-sectional view of a disk-brake assembly embodying the present invention; and FIG. 2 is a cross-sectional view taken generally along the line II—II of FIG. 1.

In the drawing, I show a brake-support yoke 1 which, in the present case, is represented as an axially shiftable yoke which is connected at 11 to the axle housing or other fixed portion of the vehicle with respect to which the disk 12 is rotatable about an axis perpendicular to the braking faces 13 and 14 of the disk. It will be understood, however, that the present invention is equally applicable to systems in which the brake yoke is fixed and the disk 12 is limitedly shiftable upon a splined shaft and to fixed-yoke systems in which a pair of wheel-brake cylinders is provided for simultaneous actuation. The yoke 1 is formed with a wheel-brake cylinder 15 in which a piston 2 is axially shiftable toward and away from the braking face 14 of the disk when hydraulic fluid is supplied from the brake master cylinder 16 of the vehicle. This cylinder is of the usual type and is actuated by a brake pedal 17 diagrammatically illustrated in FIG. 1. The piston 2 bears upon a platelike member 5 of the auxiliary actuating means 18. The auxiliary actuating mechanism includes in addition to this plate 5, a wedge body 6 whose upwardly convergent flanks 18' are complementary to the flanks of plate 5 and the rear face of the backing plate 3 of the brakeshoes. The co-operating faces of the bodies 5 and 6 are inclined to the disk 12 in the direction of convergence of the wedge body 6 so that, when the latter is drawn in the direction of arrow 10, the brakeshoe 3, 4 is cammed to the left (arrow 9) to bring the brake lining 4 which is bonded to the backing plate 3, into locking engagement with the disk 12. To displace the wedge body 6, I provide a Bowden cable whose sheath 7 bears upon plates 3 and 5 at 19 while permitting relative axial movement thereof, the core wire 8 of the Bowden line passing through the wedge body 6 and being anchored at 20 thereto. Thus, the core wire of the Bowden line serves in part as a reinforcing wire embedded in the wedge body 6. In the region of the driver's seat of the vehicle, a hand- or foot-operated lever 21 is provided to actuate the Bowden line 7, 8.

Thus, when hydraulic fluid is supplied to the cylinder 15 from the master cylinder 16, the piston 2 is shifted to the left (arrow 9) and applies braking force to the brakeshoe 3, 4 through the wedge body 6 which is composed of a vibration-damping heat-insulating elastomer or synthetic resin (e.g., neoprene, polytetrafluoroethylene, polyurethane or superpolyamide), to brake rotation of the disk 12 with respect to the support 1. Any vibrational stress imparted to the brakeshoe 3, 4 is cushioned in its transmission to the cylinder 2 and the brake housing 1. Furthermore, chattering of the brakeshoe and brake noise is reduced substantially. Frictional heat developed at the brakeshoe is prevented from conductive transmission to the piston 2 by the heat-insulating quality of the wedge member 6.

When the auxiliary brake is to be applied for emergency-braking, parking-brake or brake-locking purposes, the lever 21 is actuated to tension the Bowden line 7, 8 and draw the wedge 6 in the direction of arrow 10. Plates 3 and 5 are spread apart and, since plate 5 is seated against the piston 2 and the fluid in cylinder 15 is substantially incompressible, the brakeshoe 3, 4 is held against disk 12 by the resulting force in the direction of arrow 9. If the angle of the wedge body 6 is chosen so as to be self-locking or teeth are provided in its engaging surfaces, the body 6 will remain in its advanced position while permitting normal actuation of the brake because of the elastic compressibility of this body. Thus the wedge body 6 combines three functions, namely, vibration and sound damping, self-adjustment of the brakeshoe 3, 4 upon wear, and locking action.

In the event the wedge member 6 is not of the self-locking type, I may provide a similar arrangement at the other lobe 22 of the housing. Here, a plate 23 is interposed between the wedge body 24 and a further plate 25 which is seated against the brakeshoe 26. Plates 23 and 25 which form with upwardly converging surfaces 27, are here composed of sound-damping elastically compressible and heat-insulating resin or elastomer of the type previously described. Surfaces 27 and the complementary surfaces of the wedge body 24 are roughened or serrated at 28 so as to ensure a self-locking advance of the wedge body 24 by the springs 29 which urge the wedge body upwardly (FIG. 1). In operation, therefore, the development of play between the brakeshoe 26 and the face 13 of the disk 12 will result in the movement of the wedge body 24 through one or more serrations to reduce the play to its previous value. Reverse movement of the wedge body 24 is prevented by the teeth. The wedge body 24 is here shown to be composed of an elastomeric material in which steel cables 30 are embedded for reinforcing purposes.

As can be seen from FIG. 2, the plates 3 and 5 between which the wedge body 6 is disposed, are provided upon their faces 18' with a multiplicity of recesses 31 which are filled with graphite for lubrication of the complementarily inclined phone surfaces. A steel-wire mesh 32 is embedded in the wedge body 6 for reinforcing purposes. The brake support which is provided with an axis opening 33 of a width sufficient to enable the auxiliary devices 18 and 23–25 to be withdrawn radially with the respective brakeshoes 3, 4 and 26 for replacement, inspection or repair without dismounting the brake support.

The invention described and illustrated is believed to admit of many modifications within the ability of persons skilled in the art.

I claim:

1. A disk-brake assembly comprising a brake-support member disposed along the periphery of a brake disk; an actuating member mounted on said brake-support member; a brakeshoe member on said brake-support member displaceable in the direction of said disk by said actuating member; a generally flat wedge-shaped body of vibration-damping thermally insulating resiliently compressible material disposed between confronting surfaces of two of said members and in contact with said surfaces over substantially the major part of the confronting portions thereof for damping vibrational transmission from said brakeshoe member to said support member; and an auxiliary mechanism for displacing said body in a radial direction with respect to said disk and in the direction of convergence of said body to shift said brakeshoe member relatively to said disk and to said actuating member in a direction transverse to said disk.

2. The assembly defined in claim 1 wherein said auxiliary mechanism includes spring means for automatically moving said wedge body upon wear of the brakeshoe member.

3. The assembly defined in claim 1 wherein said auxiliary mechanism includes a remotely operable Bowden cable for moving said wedge body to lock the brake.

4. The assembly defined in claim 1, wherein said brake-support member is provided with an opening for radial removal, relative to said disk, of said brakeshoe member and said body without dismounting said brake-support member.

5. The assembly defined in claim 1 wherein said body is composed of a neoprene, tetrafluoroethylene, polyamide or a polyurethane synthetic resin.

6. The assembly defined in claim 1 wherein said body is provided with steel-wire reinforcement imbedded therein.

7. The assembly defined in claim 1 wherein at least one of said members has an inclined-plane surface co-operating with a wedging surface of said wedge body, at least one of said inclined-plane and wedging surfaces being provided with a multiplicity of grooves filled with a solid lubricant.

8. The assembly defined in claim 7 wherein said solid lubricant is graphite.

References Cited

UNITED STATES PATENTS

| | | | |
|---|---|---|---|
| 2,743,966 | 5/1956 | McKernan | 308—3 |
| 3,146,810 | 9/1964 | Keesling | 308—239 X |
| 3,236,335 | 2/1966 | Dowell | 188—73 |
| 3,269,491 | 8/1966 | Belart et al. | 188—73 |
| 3,298,469 | 1/1967 | Robinette | 188—73 |
| 3,310,135 | 3/1967 | Wells | 188—73 |
| 3,340,967 | 9/1967 | Farr et al. | 188—106 |

FOREIGN PATENTS

| | | |
|---|---|---|
| 1,330,418 | 5/1963 | France. |
| 1,345,576 | 11/1963 | France. |
| 772,070 | 4/1957 | Great Britain. |

GEORGE E. A. HALVOSA, *Primary Examiner.*

U.S. Cl. X.R.

188—106, 196